US005564543A

United States Patent [19]
Wilson

[11] Patent Number: 5,564,543
[45] Date of Patent: Oct. 15, 1996

[54] TRANSMISSION CONTROL VALVES

[75] Inventor: Thomas H. Wilson, Indianapolis, Ind.

[73] Assignee: General Motors Corporation, Detroit, Mich.

[21] Appl. No.: 432,645

[22] Filed: May 3, 1995

[51] Int. Cl.⁶ ............................................... F16H 61/26
[52] U.S. Cl. .................... 192/85 R; 192/114 R; 477/131; 91/453
[58] Field of Search .................. 192/85 R, 87.11, 192/114 R; 477/125, 131, 138, 906; 91/453; 60/399, 403

[56] References Cited

U.S. PATENT DOCUMENTS

| | | | |
|---|---|---|---|
| 3,709,064 | 1/1973 | Schaefer et al. | 477/125 X |
| 4,351,206 | 9/1982 | Lemieux et al. | 477/906 X |
| 4,729,462 | 3/1988 | Braun | 192/114 R X |
| 5,048,656 | 9/1991 | Braun | 192/114 R X |
| 5,131,514 | 7/1992 | Machida | 192/85 R |

*Primary Examiner*—Richard M. Lorence
*Attorney, Agent, or Firm*—Donald F. Scherer

[57] ABSTRACT

Shift control valves for controlling the engagement of a transmission friction devices have a solenoid control chamber pressurized to initiate shifting and a latch chamber pressurized to sustain the selective friction device in an engaged position. The latching chamber pressure is delivered through a latch valve which is also solenoid controlled to direct pressure to the chamber when the solenoid is de-energized and to exhaust the latch chamber when the solenoid is energized.

3 Claims, 1 Drawing Sheet

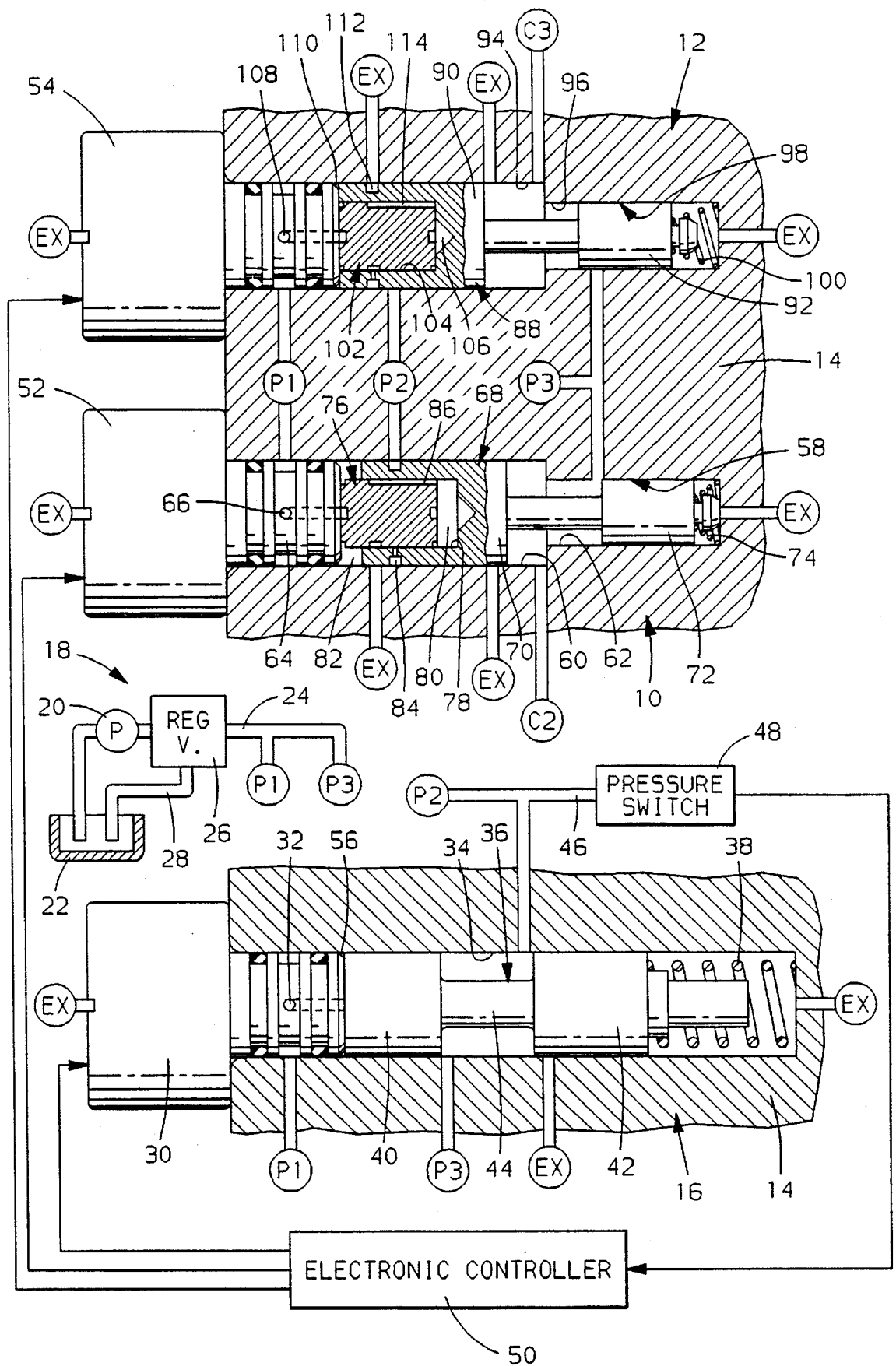

1

TRANSMISSION CONTROL VALVES

TECHNICAL FIELD

This invention relates to transmission controls and, more particularly, to hydroelectric control valves.

BACKGROUND OF THE INVENTION

Automatic shifting power transmissions, whether of the planetary or countershaft type, utilizing hydraulically actuated friction clutches and brakes incorporate shift valves for controlling the interchange and engagement of each of the friction devices. These shift valves have been of various designs including fully hydraulically actuated valves and fully solenoid controlled valves with a combination of solenoid and hydraulic actuation.

It has also been desirable in power transmissions when utilizing electrical members to ensure that the power transmission will remain in at least one selected gear should the electrical energy be discontinued between the source and the control valves.

SUMMARY OF THE INVENTION

It is therefore an object of the present invention to provide an improved transmission control valve arrangement, wherein a plurality of shift valves are individually controlled and latched in a shifted position to control the engagement, disengagement and maintenance of the friction devices.

One aspect of this invention is found in the use of a latching valve which is also solenoid operated, such that in the de-energized condition of the solenoid a valve member is operable to direct high pressure fluid to a latching passage which is connected with each of a plurality of electronically controlled shift valves.

In an another aspect of this invention, the latching pressure supplied by the latch valve is directed to a separate latching chamber which will maintain selected ones of the shift valves in the shifted position whenever the electrical energy to the shift valves is discontinued.

DESCRIPTION OF THE DRAWING

The drawing is a diagrammatic and schematic representation of a portion of a transmission control incorporating the present invention.

DESCRIPTION OF AN EXEMPLARY EMBODIMENT

The present invention is defined in a transmission control having a plurality of shift valves 10 and 12 disposed in a valve housing 14, a latch valve 16 disposed in the valve housing 14, and a fluid supply or source of pressure 18. The source of pressure 18 includes a conventional positive displacement pump 20 which draws fluid from a reservoir 22 for delivery to passages P1 and P3 through a conduit 24.

The pressure in conduit 24 is controlled by a conventional pressure regulator valve 26 which returns excess fluid from pump 20 to the reservoir 22 through a passage 28. Other pressure source combinations might be used, in particular, the pump 20 might be a variable displacement pump which is limited in pressure by reductions in pump volume or displacement in a well known manner. Also, the regulator valve 26 may be comprised of two or more regulator valves supplying differing control pressures in the passages P1 and P3, if desired. For example, passage P1 is a solenoid pressure control feed passage which will include conventional filters and can operate at a lower pressure than the pressure in passage P3, since the pressure in passage P3 will be utilized to control the engagement of various friction devices.

The latch valve 16 includes a conventional solenoid control valve 30 which has an inlet 32 in fluid communication with passage P1, a valve bore 34 formed in the valve housing 14, a valve spool 36 slidably disposed in the valve bore 34 and a return spring 38 disposed between one end of the valve bore 34 and the valve spool 36. The valve spool 36 includes a pair of spaced lands 40 and 42 separated by a stem 44 which is disposed in a valley between the lands 40 and 42.

The passage P3 is disposed in fluid communication with the valve bore 34 between the lands 40 and 42 whenever the spool 36 is in the spring set position shown in the drawing. A latching passage P2 is also in communication with the space between the lands 40 and 42 when the valve spool 36 is in the spring set position. The passage P2 is in further fluid communication through a passage 46 with a conventional pressure switch 48. The pressure switch 48 is effective to supply a control signal for status to a conventional electronic controller 50 which may include a digital computer or other information processor capable of using external signals to establish operating criteria for a transmission. Such devices are well known and it is not believed that further discussion of such devices is required at this juncture.

The electronic controller 50 does have electrical connection with the solenoid valve 30 and also with solenoid control valves 52 and 54 which are associated with shift valves 10 and 12, respectively. The electronic signals generated by the electronic controller are effective to energize or permit de-energization of the respective solenoid controls, such that hydraulic valves associated therewith are operable to provide an output pressure or exhausting pressure according to the position of the solenoid control.

When the solenoid control 30 is energized, fluid pressure at passage 32 is directed to a chamber 56 disposed between the solenoid valve 30 and land 40 of the valve spool 36. Fluid pressure in this chamber will cause the valve spool 36 to move against the spring 38 thereby assuming a pressure set position. In the pressure set position, the passage P3 is blocked from entering the bore 34 by the land 40 while the passage P2 is exhausted between the lands 42 and 40 at an exhaust passage connected with the bore 34. It can be noted in the drawing that the exhaust passage is blocked by land 42 when the valve is in the spring set position. Accordingly, it should now be evident that the passage P2 is pressurized from passage P3 whenever the latch valve 16 is in the spring set position and the passage P2 is exhausted whenever the latch valve 16 is in the pressure set position.

The shift valve 10 includes a stepped diameter bore 58 having a large diameter bore or portion 60 and a small diameter bore or portion 62. The large diameter portion 60 encloses a portion 64 of the solenoid control 52. This portion 64 of the solenoid control 52 has an inlet port 66 which is disposed in fluid communication passage P1 to thereby supply fluid pressure to the solenoid control 52.

A valve spool 68 is slidably disposed in the bore 58 and includes a large diameter land 70 slidably disposed in the portion 60, and a small diameter land 72 is slidably disposed in the portion 62. A return spring 74 is positioned between one end of the bore 58 and the land 72 to urge the valve spool 68 toward the solenoid control 52.

A latch plug 76 is slidably disposed in a recess or bore 78 formed in the large diameter land 70. The plug 76 and recess 78 cooperate to form a latch chamber 80 between the bottom of bore 78 and the plug 76. The left end of valve spool 68 and the plug 76 are exposed to a shift chamber 82 which is in fluid communication with the solenoid control 52.

The large diameter portion 60 is in fluid communication with a conventional fluid operated friction device C2, a pair of exhaust passages, and the passage P2. The small diameter portion 62 is in fluid communication with the passage P3. The passage P3 is connected with the friction device C2 between the lands 70 and 72 when the valve spool 68 is in the pressure set position, as shown in the drawing, and the friction device C2 is connected to exhaust between lands 70 and 72 when the valve spool 68 is in the spring set position.

The land 70 has a recess annular port 84 which is disposed for fluid communication with the bore 78. In the position shown, the passage P2 is in fluid communication with the annular recess 84 which, in turn, is in communication with a longitudinal recess or passage 86 formed along the plug 76 to provide fluid communication between the passage P2 and the latch chamber 80. Thus, with the latch valve 16 in the position shown, the latch chamber 80 will be pressurized from passage P3 through the valve 16 to passage P2 and from the passage P2 through passage 86 to the latch chamber 80. It should be appreciated that the area of plug 76 will be greater than the differential area between lands 70 and 72.

The pressure in the latch chamber 80 will maintain the shift valve 10 in the shifted or pressure set position shown until the passage P2 is exhausted via the latch valve 16. Thus, once a shift has been accomplished, the associated friction device, in this case C2, can be maintained energized regardless of the condition of the solenoid control 52. Therefore, should electrical power to the system for some reason be interrupted or intentionally discontinued, the friction device C2 would remain engaged and the transmission would remain operable.

The shift valve 12 is similar in construction to the shift valve 10 and includes a valve spool 88 having a large land 90 and a small land 92 slidably disposed in respective large and small diameter bores or portions 94 and 96 of a valve bore 98. The shift valve 12 further includes a return spring 100 disposed between the valve land 92 and one end of the valve bore 98.

A plug valve 102 is slidably disposed in a chamber or bore 104 formed in the land 90 and cooperates therewith to provide a latch chamber 106 similar to latch chamber 80. The shift valve 12 also includes the solenoid control 54 which includes an inlet port or passage 108 in fluid communication with the pressure passage P1. The large bore 94 of bore 98 is disposed in fluid communication with two exhaust ports and a friction device C3. The friction device C3 is connected to an associated fluid passage which, when pressurized, will engage to enforce a gear ratio within the transmission, not shown.

In the position shown, the shift valve 12 connects the space between lands 90 and 92 with one of the exhaust passages, such that the friction device C3 is exhausted. The small diameter bore 96 is in fluid communication with the passage P3 in a manner similar to that described above for the bore 62.

When it is desirable to change ratios and thereby disengage the friction device C2 and engage the device C3, the solenoid control 30 is energized thereby enforcing the latch valve 16 to exhaust the pressure in passage P2. With the pressure in passage P2 exhausted, the latch chamber 80 will be exhausted and the valve spool 68 will return to its spring set position under the influence of the spring 74 and the residual pressure of device C2 acting on the differential area of lands 70 and 72 provided the chamber 82 is also exhausted.

To complete the ratio interchange, the solenoid 54 is energized, such that fluid pressure in port 108 is communicated with a shift chamber 110 disposed between the solenoid control 54 and the left end of land 90. This pressurization will cause the shift valve 12 to assume the pressure set position thereby communicating the pressure in passage P3 with the friction device C3 thereby engaging this device. Thus, the ratio interchange will have been completed. At this point, the solenoid control 30 of latch valve 16 is de-energized thereby redirecting pressure in passage P3 to passage P2 which, due to the pressure set position of spool valve 88, will be aligned with a recess 112 on the land 90 which, as described above for shift valve 10, is directed via a longitudinal passage 114 to the latch chamber 106. This pressure will maintain the shift valve 12 in the upshifted or pressure set position, such that the friction device C3 is engaged.

Upon the return of valve spool 68 to the spring set position, the annular recess 84 is connected with one of the exhaust passages thereby preventing the further pressurization of the latch chamber 80. Also, in the spring set position, the passage P2 is disconnected from the annular recess 84.

The ratio interchange between the friction devices C3 and C2 can be accomplished in a number of ways. The friction devices can be overlapped, that is, both be maintained in some partial engagement during the ratio interchange. The amount of overlap is generally dependent upon the torque level being transmitted at the time of the shift. During the ratio interchange, the solenoid control 30 is maintained energized, such that the passage P2 is exhausted. With this condition, the shifting or control pressures on each of the shift valves is limited or controlled by the respective controls 52 and 54. As is well known, these devices, if desired, can provide a variable output pressure which will control the fluid flow between the passage P3 and the respective friction devices. This will, of course, control the pressure in the friction device and thereby the engagement force.

After the interchange has been completed, however, the solenoid control 30 is de-energized thereby pressurizing the passage P2. This results in the latching pressure in passage P2 being distributed to the respective latch chamber 80 or 106 depending upon the friction device engaged.

At this point, it is possible to discontinue electrical control signals to all of the solenoids 30, 52 and 54 until a ratio interchange is desired. The completion of this ratio interchange and the presence of latching pressure in passage P2 signaled by the pressure switch 48 which will inform the electronic controller 50 that the latch pressure has been applied and the electrical power to the solenoids can be discontinued until a ratio interchange is demanded by the vehicle operating conditions.

While the exemplary embodiment discloses or describes two shift valves, it is, of course, quite obvious to those skilled in the art at this point that any number of shift valves can be incorporated and will determine the number of gear ratios within the given transmission. However, independent of the number of shift valves utilized, a single valve can be incorporated to control the latching operation of essentially any number of shift valves.

Obviously, many modifications and variations of the present invention are possible in light of the above teaching.

It is therefore to be understood, that within the scope of the appended claims, the invention may be practiced otherwise than as specifically described.

I claim:

1. A transmission control comprising:

a source of fluid pressure;

a solenoid operated shift control valve communicating with said source and having a shift valve movable to an engage position and a disengage position, having a solenoid control for supplying shift pressure fluid, a fluid chamber means for receiving the shift pressure fluid to urge the shift control valve to the engage position, and a spring for urging the shift control valve to the disengage position; and latching control means communicating with said source for selectively providing a latching pressure fluid and an exhaust connection to said chamber, said latching pressure fluid maintaining the shift control valve in the engaged position independently of the operation of the shift pressure fluid when the shift valve is in the engaged position, and means for disconnecting the latching pressure fluid and connecting the exhaust connection when the disengage position is desired.

2. A transmission control comprising:

a source of fluid pressure;

a solenoid operated shift control valve communicating with said source and having a shift valve movable to an engage position and a disengage position, having a solenoid control for supplying shift pressure fluid, a fluid chamber means for receiving the shift pressure fluid to urge the shift control valve to the engage position, and a spring for urging the shift control valve to the disengage position; and latching control means communicating with said source including a solenoid control valve, a spring and a spool valve responsive to the solenoid control valve and spring to establish a pressure set position and a spring set position for selectively providing a latching pressure fluid and an exhaust connection to said chamber, said latching pressure fluid maintaining the shift control valve in the engaged position independently of the operation of the shift pressure fluid when the shift valve is in the engaged position, and means including said solenoid control valve and said spool valve for disconnecting the latching pressure fluid and connecting the exhaust connection when the disengage position is desired.

3. The transmission control defined in claim 2 further comprising a friction device engaged and disengaged by said solenoid operated shift control valve; and control signal means for energizing said solenoid control and said solenoid control valve, said latching control means being operable to maintain the friction device engaged if said control signal means is interrupted.

* * * * *